United States Patent [19]
Muller

[11] 3,747,367
[45] July 24, 1973

[54] BELLOWS FLEXIBLE JOINT
[75] Inventor: George H. Muller, Ann Arbor, Mich.
[73] Assignee: Ford Motor Company, Dearborn, Mich.
[22] Filed: Dec. 23, 1971
[21] Appl. No.: 211,494

[52] U.S. Cl. .................. 64/11 B, 64/15 R, 285/226
[51] Int. Cl. ............................................. F16d 3/28
[58] Field of Search .................... 64/11 B, 15 R, 32; 285/226

[56] References Cited
UNITED STATES PATENTS
| | | | |
|---|---|---|---|
| 3,623,339 | 11/1971 | Muller | 64/11 B |
| 3,058,759 | 10/1962 | McDuff | 285/226 |
| 3,621,674 | 11/1971 | Ulics et al. | 64/11 B |
| 3,678,707 | 7/1972 | Ulics | 64/11 B |

Primary Examiner—Charles J. Myhre
Assistant Examiner—Randall Heald
Attorney—Keith L. Zerschling and Roger E. Erickson

[57] ABSTRACT

A flexible joint for transferring torque and rotary motion which includes a first cylindrical bellows interconnecting and secured to a driving member and a driven member. A second cylindrical member is received within the bellows and is engagable with but unsecured to the driving member and the driven member. An injected elastomeric compound is received within the first cylindrical bellows and about the second cylindrical member and functions to reduce torsionally induced stresses within the bellows.

7 Claims, 1 Drawing Figure

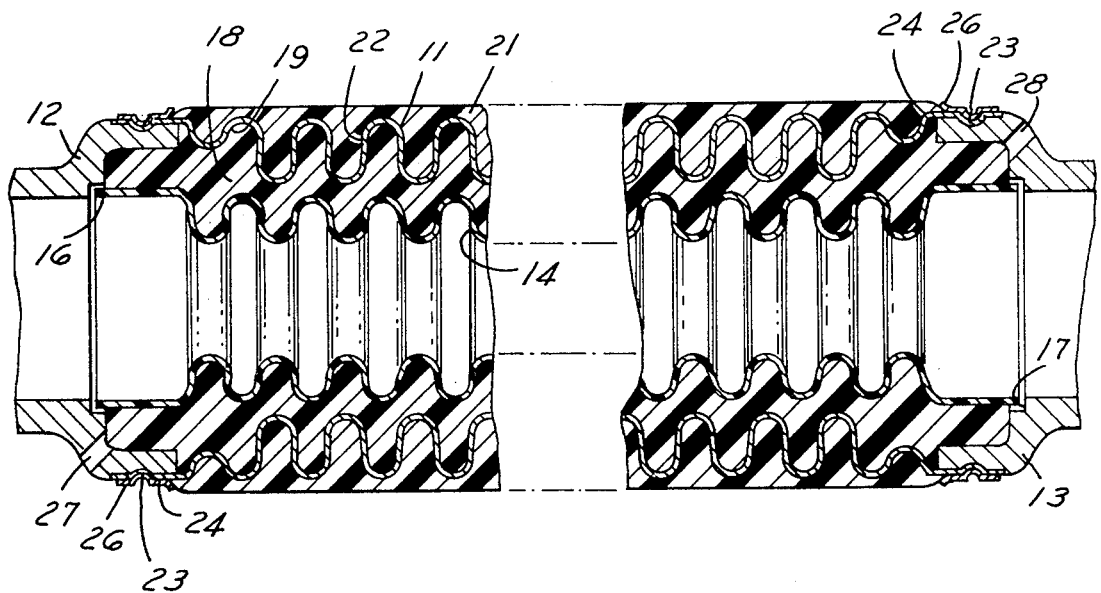

BELLOWS FLEXIBLE JOINT

BACKGROUND AND SUMMARY OF THE INVENTION

A common universal joint used to transmit motion between two angularly misaligned rotating shafts is the simple Cardan joint. There are, however, many applications in which a Cardan joint is not well suited. One such application is where the nonuniform motion transmission characteristics of a Cardan joint provide unacceptable velocity variations between the input and output shafts. Another such application is where the weight or size of the joint is of primary importance. Many essentially constant velocity joints are presently available, but are often too cumbersome or too expensive for many applications where such constant velocity is desired.

It has been found that a simple cylindrical bellows positioned between two end members provides a substantially constant velocity flexible coupling for rotating shafts at relatively low torque loads and low speeds. See, for example, U.S. Pat. No. 3,232,076, granted Feb. 1, 1966 to Sundt. It should be noted, however, that as the ratio of the transmitted torque to the longitudinal bending stiffness of the bellows increases, a simple bellows experiences increases torsional windup. This is because the bellows is characteristically stiff in torsion but is relatively flexible in longitudinal bending. Torsional windup in a bellows joint undesirably limits its torque-bearing capacity. It is not a solution to the problem of torsional windup to increase the overall stiffness of the bellows so as to achieve sufficiently high longitudinal bending stiffness to prevent an undesirable degree of torsional windup. Such a joint would not be flexible enough in longitudinal bending and would be too highly stressed to provide a durable flexible joint.

A means of increasing the torsional stiffness of a bellows type flexible joint without excceding the limits of permissible longitudinal stiffness is to fill the grooves of the bellows member with an elastomeric compound. Such a reinforced beloows flexible joint is shown in U.S. Pat. No. 3,621,674, granted Nov. 23, 1971 to Ulics and Wheatly. The invention to be described in this application is an improvement over the joint described in the just mentioned patent.

This invention provides an elastomeric reinforced bellows flexible joint in which the elastomeric material received within the bellows can be injected without the use of an inner core which must be removed. This invention also provides a construction in which the "core" that is used to confine the injected molten elastomeric material becomes an integral part of the joint assembly and continues to function as a retainer to assure that the elastomeric material will not be worked out of the grooves of the bellows. Thus, the invention also increases the durability of a bellows flexible joint. Finally, the invention provides a bellows type flexible joint that yields substantial economies in manufacture and that provides a reliable and compact joint construction.

A flexible torque transfer assembly constructed in accordance with this invention includes a rotatable driving member and a rotatable driven member interconnected by a flexible bellows member. The flexible member is secured to the driving and driven members and is constructed to transmit a torque and rotary motion therebetween. The flexible member permits angular displacement of the driven member relative to the driving member from an axially aligned position to various positions of axial misalignment. The bellows is generally cylindrical in shape and includes a plurality of inwardly and outwardly facing grooves. A second flexible member is recived within and radially spaced from the first flexible bellows member and is engagable with but unsecured to the driving member and the driven member. Elastomeric material fills the enclosure between the first cylindrical bellows and the second flexible member and between the driven member and the driving member.

BRIEF DESCRIPTION OF THE DRAWING

The drawing shows a cross sectional view of a bellows flexible joint embodying the invention.

DETAILED DESCRIPTION OF A PREFERRED EMBODIMENT

In the preferred embodiment, a metal cylindrical bellows member 11 is secured to an interconnects a pair of rotatable end members 12 and 13 as shown in FIG. 1 of the drawings. These rotatable end members are commonly referred to as the driving member and the driven member depending upon their relationship to the power source and the device which is driven. The bellows member may be constructed of a single ply or multiple plies of stainless steel of a thickness dependent upon the load to be carried. A second flexible cylindrical member 14 which also may take the form of a bellows, is concentrically received within the outer cylindrical bellows 11. The ends of the flexible member 14 engage the end members 12 and 13 at circular seats 16 and 17, respectively, but are otherwise unsecured to the end members. The inner bellows 14 may be formed of single ply metal stock of material similar to that of the torque bearing outer bellows 11. The inner bellows may be constructed of relatively light material since it carries no torque. The two end members, the outer bellows and the inner bellows define an annular shaped enclosure or cavity. This enclosure is filled with elastomeric material such as urethane referred to in the drawing by reference numeral 18. It may be noted that the elastomeric material is received into each of the radially inwardly opening grooves or convolutions 22. The cylindrical wall of torque bearing bellows 11 is thus sandwiched between two layers of elastomeric material. The hardness of the elastomer is determined as a function of the maximum angle between the rotating shafts and the amount of torque to be carried by the joint assembly.

A radially outwardly facing groove 23 is provided in each of the end members 12 and 13 over which the sleeve end 24 of the outer bellows 11 is positioned prior to fastening to the end member. A metal ring 26 is slidably positioned about the bellows sleeve end 24 immediately over the groove 23. The sleeve end and the ring are electromegnetically shrunk into the groove to provide an effective and secure connection of the bellows to each end member. This process is known as the Magneform process and is described in detail in U.S. Pat. No. 2,976,907 issued Mar. 28, 1961 to Harvey and Brower.

End member 12 includes an inlet opening 27 through which molten elastomeric material 18 may be injected into the cavity between bellows 11 and 14. A similar opening 28 is formed in end member 13 which serves as an air escape when the injection process is taking place. Suitable connections are provided on each of the end members for connection to shafts.

It may thus be seen that inner bellows 14 functions as a "core" to confine the molten elastomeric material 18 during its injection, as well as a retainer to prevent the elastomeric material from working out of the grooves 19 of bellows 11 to increase the durability of the flexible joint.

Modifications and alterations will occur to those skilled in the art which are included within the scope of the following claims:

I claim

1. A bellows-type universal joint comprising
a pair of rotatable end members,
a first flexible cylindrical bellows having its axial ends secured to said end members con-structed to transmit a torque therebetween,
said first bellows and said end members being rotatable about the axis of said cylindrical bellows,
a second flexible cylindrical bellows received within said first bellows,
the ends of said second bellows being engage-able with said end members and unsecured thereto and comprising a non-torque-bearing member,
elastomeric material received between said first bellows and said second bellows,
said end members being relatively movable to rotate about nonaligned axes.

2. A flexible torque transfer assembly compris-ing:
a rotatable driving member and a rotatable driven member,
flexible means interconnecting said driving member and said driven member constructed to transmit torque and rotary motion between said members,
said flexible means permitting angular dis-placement of the driven member relative to the driving member from an axially aligned position to various positions of axial misalignment,
said flexible means comprising a first cylin-drical bellows interconnecting and secured to said driving member and said driven member and comprising a torque-bearing element of said flexible means, said bellows having a plurality of grooves formed therein,
a second cylindrical bellows received within said first cylindrical bellows and radially spaced therefrom, said second bellows being engageable with and un-secured to said driving member and said driven member and comprising a non-torque-bearing ele-ment of said flexible means,
means to reduce torsionally induced stresses within and deformation of said first cylindrical bellows comprising elastomeric material received between said first bellows and said second bellows.

3. A flexible torque transfer assembly according to claim 2,
said second cylindrical bellows being concen-tric with said first cylindrical bellows when the torque transfer assembly is in an aligned condition.

4. A flexible torque transfer assembly according to claim 2,
said second cylindrical bellows having greater flexi-bility than said first cylindrical bellows.

5. A flexible torque transfer assembly comprising:
a rotatable driving member and a rotatable driven member,
flexible means interconnecting said driving member and said driven member constructed to transmit torque and rotary motion between said members,
said flexible member permitting angular dis-placement of the driven member relative to the driving member from an axially aligned position to various positions of axial misalignment,
said flexible means including a first cylin-drical bellows interconnecting and secured to said driving member and said driven member, said bellows hav-ing a plurality of grooves formed therein,
a second cylindrical bellows received within said first cylindrical bellows and radially spaced therefrom, said second bellows engaging and unsecured to said driving member and said driven member,
said second bellows being coaxial with said first bel-lows,
an annular enclosure defined by said first and second bellows and said driving and driven members,
means to reduce torsionally induced stresses within and deformation of said first bellows comprising elastomeric material received within and filling said annular enclosure,
inlet means to said enclosure constructed to permit the injection of said elastomeric material in its mol-ten state,
outlet means from said enclosure constructed to per-mit the escape of air from said enclosure during in-jection of molten elastomeric material.

6. A flexible torque transfer assembly according to claim 5,
said inlet means being formed in one of said rotatable members,
said outlet means being formed in the other of said rotatable members.

7. A flexible torque transfer assembly according to claim 5,
said second bellows having greater flexibility than said first bellows.

* * * * *